United States Patent [19]

Woodward

[11] 3,926,893
[45] Dec. 16, 1975

[54] POLISH CONTAINING A $C_{21}$ -CYCLOALIPHATIC DICARBOXYLIC ACID

[75] Inventor: Fred E. Woodward, West Palm Beach, Fla.

[73] Assignee: Westvaco Corporation, New York, N.Y.

[22] Filed: Aug. 26, 1974

[21] Appl. No.: 500,569

[52] U.S. Cl.... 260/29.6 R; 260/23 AR; 260/28.5 R; 260/29.6 RW
[51] Int. Cl.² .......................................... C08L 91/06
[58] Field of Search ...... 260/28.5 R, 29.6 R, 29.6 H, 260/514 K, 23 AR

[56] References Cited
UNITED STATES PATENTS

| | | | |
|---|---|---|---|
| 2,937,098 | 5/1960 | Geen | 106/10 |
| 3,290,264 | 12/1966 | Baranauckas | 260/28.5 R |
| 3,503,912 | 3/1970 | Lynch | 260/28.5 R |
| 3,503,913 | 3/1970 | Lynch | 260/28.5 R |
| 3,532,654 | 10/1970 | Finn | 260/28.5 R |
| 3,734,859 | 5/1973 | Ward | 260/514 K |
| 3,753,968 | 8/1973 | Ward | 260/97.6 |

Primary Examiner—Paul R. Michl
Attorney, Agent, or Firm—Richard L. Schmalz; Ernest B. Lipscomb, III

[57] ABSTRACT

There is disclosed an aqueous floor polish composition of the emulsion type containing, a water-insoluble polymer, a waxy material, a leveling agent and a plasticizer, the improvement which comprises using as the plasticizer and/or the leveling agent the ammonium salt of a $C_{21}$-cycloaliphatic dicarboxylic acid of the formula

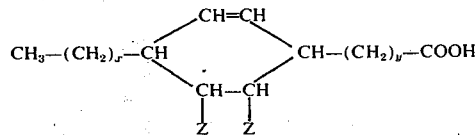

wherein x and y are integers from 3 to 9, x and y together equal 12 and Z is H or COOH with one Z of each moiety.

7 Claims, No Drawings

POLISH CONTAINING A $C_{21}$-CYCLOALIPHATIC DICARBOXYLIC ACID

BACKGROUND OF THE INVENTION

1. Field of the Invention

This invention relates to improvements in polishes. More particularly, this invention relates to the inclusion in emulsion-type, dry-bright floor polishes of $C_{21}$-cycloaliphatic dicarboxylic acid salts as plasticizers and leveling agents.

2. The Prior Art

Dry-bright type aqueous floor polish dispersions are complex blends of a variety of materials each designed to accomplish one or more specific purposes. Several polymers are required to produce the gloss, and wear properties desired. These include acrylic and acrylic-styrene copolymers for scuff resistance, water spot resistance, and gloss, and low molecular weight polyethylene wax sometimes blended with natural and microcrystalline petroleum waxes to impart toughness and buffability. Alkali soluble low molecular weight polymers such as styrene-maleic anhydride and rosin maleic anhydride resins, known as leveling resins, improve the smoothness and gloss of the polish and increase the ease of polish removal.

Several types of plasticizers are also included in the formulation to soften the hard waxes, alkali soluble resins and emulsion polymers sufficiently to allow them to coalesce after application into a coherent film which firmly attaches to the substrate without imparting an undesirable degree of flexibility to the film. Insufficient plasticization causes defects such as crazing, dusting and in extreme cases splintering away from the surface. Two types of plasticizers are required, an oil or wax soluble material such as the polyethylene glycol ethers or dibutyl phthalate and a more hydrophilic plasticizer like tri(butoxyethyl) phosphate which has greater plasticizing effect on the alkali soluble components. The water organic solvent 2-pyrrolidone is yet another plasticizer which functions as a non-migrating internal plasticizer in the dry polish system. In addition to the above-named components, it is desirable to add a wetting agent, such as a fluorinated hydrocarbon surfactant to improve the wetting power of self-polishing wax formulations.

It is thus the general object of this invention to provide a dry-bright polish composition containing a $C_{21}$-cycloaliphatic dicarboxylic acid salt as the leveling agent. Another object of this invention is to provide a dry-bright polish with a $C_{21}$-cycloaliphatic dicarboxylic acid salt as a plasticizer. Still another object is to provide a dry-bright polish composition containing the ammonium salt of a $C_{21}$-cycloaliphatic dicarboxylic acid as both a plasticizer and a leveling agent.

Other objects, features and advantages of this invention will be evident from the foregoing detailed description.

SUMMARY OF THE INVENTION

It has been found that the ammonium salt of a $C_{21}$-cycloaliphatic dicarboxylic acid having the formula

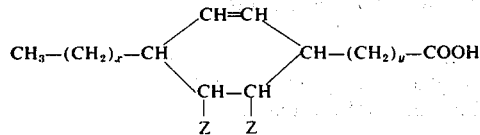

wherein x and y are integers between 3 and 9, x and y together equal 12, and Z is H or COOH with one Z of each moiety, when used as a plasticizer and/or the leveling agent in a dry-bright polish formulation gives excellent results when used as plasticizer replacements for glycol ethers and as leveling agent replacements for styrene-maleic anhydride resins especially with regard to water resistance, detergent resistance, streaking, cracking, crazing and hazing.

DETAILED DESCRIPTION OF THE INVENTION

The polishing compositions of the type of which the present invention constitutes an improvement thereon can generally be defined in terms of the following proportions of the three main components.

| Component | Proportion (Parts by Weight) Broad | Preferred |
|---|---|---|
| (A) Polymer Emulsion | 10–100 | 40–70 |
| (B) Wax Emulsion | 0–90 | 10–50 |
| (C) Leveling Agent | 0–50 | 10–50 |

[1]The total of A, B and C should be 100.

with the amount of each component used depending upon the characteristics of the film desired. For example, L. Chalmers, Domestic and Industrial Chemical Specialties (Leonard Hill, 1966) suggests to produce a non-scuffing film which cannot be easily rebuffed: polymer emulsion 60–70 parts; leveling agent 10–20 parts; and wax emulsion 10–25 parts. For a non-scuffing film with moderate buffability: polymer emulsion 45–55 parts; leveling agent 10–20 parts; and wax emulsion 25–35 parts. And for a rebuffable formula with only moderate scuff-resistance: polymer emulsion 40–50 parts; leveling agent 10–20 parts; and wax emulsion 40–50 parts. Satisfactory nonbuffable floor polish formulations may be made without the inclusion of a wax. Thus, the wax emulsion component is not an essential component of a self-polishing composition.

Additional components include:

| Component | Percent Broad | Preferred |
|---|---|---|
| (D) Plasticizers | [1]0–75 | [2]5–35 |
| (E) Wetting, Emulsifying and Dispersing Agents | [1]0.1–30 | 1–15 |
| (F) Polyvalent Metal Compounds | [2]1.0–50 | |
| (G) Water to Make Total Solids | 3–45 | 10–20 |

[1]On weight of A + B + C.
[2]On weight of A.

The alkali-soluble leveling agents used in the polish compositions of this invention are ammonium salts of a $C_{21}$-cycloaliphatic dicarboxylic acid of the formula

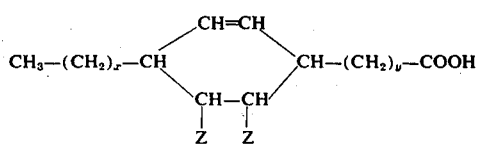

wherein x and y are integers from 3 to 9, and x and y together equal 12 and Z is H or COOH with one Z of each moiety. These $C_{21}$-dicarboxylic acids have been found to have equal freedom from streaking, cracking, crazing and hazing when used at equal levels in place of the more conventional styrene-maleic anhydride resins, shellac and the like of the prior art. The ammonium salt of $C_{21}$-cycloaliphatic dicarboxylic acid is produced from conjugated and non-conjugated linoleic acids and is more fully described in U.S. Pat. No. 3,734,859 to Ward and incorporated herein by reference. A process for obtaining the $C_{21}$-cycloaliphatic dicarboxylic acid is described in U.S. Pat. No. 3,753,968 also to Ward and incorporated herein by reference. The amount of leveling agent may be from 0 parts to 50 parts the weight of the total of the polymer emulsion, wax emulsion and leveling agent, preferably from about 5 parts to 25 parts of the weight of the polymer emulsion.

As stated, the ammonium salt of the $C_{21}$-dicarboxylic acid may also be used as the plasticizer or both the leveling agent and the plasticizer. In compositions where the $C_{21}$-dicarboxylic acid is used only as a plasticizer, conventional alkali-soluble resin leveling agents may be used.

Examples of alkali-soluble resins include shellac, Manila gum, loba gum, copolymers of styrene or vinyltoluene with at least one $\alpha$-$\beta$ monoethylenically unsaturated acid or anhydride such as styrene-acrylic acid resins or styrene-maleic anhydride resins, and alkali-soluble alkyds, which are essentially polyesters of aliphatic dicarboxylic acids with aliphatic polyhydric alcohols which may be modified with $C_8$–$C_{18}$ fatty acids, glycerol esters of $C_8$–$C_{18}$ fatty acids, and resin acids, such as abietic or rosin. The resins disclosed in U.S. Pat. No. 2,063,542 may be used. Examples of the dicarboxylic acids include maleic, fumaric, adipic, sebacic, including anhydrides thereof. The polyhydric alcohols may be glycerol, pentaerythritol, trimethylolethane, and glycols having 2 to 8 carbon atoms including diethylene glycol and triethylene glycol.

Other alkali-soluble resins include rosin-maleic anhydride adducts modified with polyols and rosin-fumaric acid adducts modified with polyols. Representative polyols are ethylene glycol, glycerol, propylene glycol, pentaerythritol and mixtures thereof. The alkali-soluble resin is generally added to the polish formulation as a resin cut which is an aqueous alkaline solution obtained by solubilizing the alkali-soluble resin with an alkaline substance such as ammonium hydroxide.

The polymer emulsion is obtained by emulsion polymerization of one or more monoethylenically unsaturated monomers including acrylic esters of acrylic or methacrylic acid wherein the alcohol moiety of the ester is derived from benzyl alcohol, phenol, or a saturated monohydric aliphatic alcohol, especially an alkanol having 1 to 8 carbon atoms, such as cyclopentanol, cyclohexanol, methanol, ethanol, n-propanol, isopropanol, n-butanol, isobutanol, sec-butanol, tert-butanol, any of the pentanols, hexanols, octanols, decanols, dodecanols, hexadecanols, and octadecanols. Preferred polymers are copolymers containing at least one of these esters of acrylic acid with one or more monomers selected from the group consisting of $(C_1$–$C_4)$-alkyl methacrylates, acrylonitrile, methacrylonitrile, vinyl acetate, styrene vinyltoluene (o, m, or p), vinyl chloride or vinylidene chloride. In place of part or all of the acrylic acid ester component, the preferred type of polymer may contain a $(C_5$–$C_{18})$-alkyl methacrylate. Blends of these copolymers may be used. The polymers may also be graft copolymers including grafts of the monomers mentioned on shellac.

The polymers may contain from up to 18 percent of an $\alpha,\beta$-monoethylenically unsaturated acid, such as maleic, fumaric, aconitic, crotonic, acrylic, methacrylic, or itaconic acid, the latter three being preferred, for the purpose of making the coatings deposited therefrom readily removable by the application of alkaline media, such as dilute aqueous ammonia. If desired, the polymer may contain minor amounts, generally less than about 10 percent, and preferably from about 1 percent to 6 percent, of polymerized units of at least one monomer containing amine groups to render the coatings deposited readily removable by the application of acid media, such as dilute aqueous acetic acid solutions. Examples of amine-containing monomers are: any of the vinylpyridines, or any compound of the formula

wherein R is selected from the group consisting of H, Cl, and $CH_3$.

$R^2$ is selected from the group consisting of H and saturated hydrocarbon groups having from 1 to 10 carbon atoms such as methyl, ethyl, butyl, 2-ethylhexyl, cyclohexyl, and t-octyl.

A is selected from the group consisting of –O–, S,

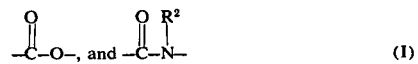

and R' is a straight or branched chain alkylene group having from 2 to 10 carbon atoms. Members $R^2$ may be identical or different groups in their several occurrences in any particular compound.

Examples of monomers of Formula I are:
N-(3-dimethylamino) propyl methacrylate;
t-Butylaminoethyl methacrylate;
Dimethylaminoethyl methacrylate;
N-($\beta$-dimethylaminoethyl) acrylamide;
N-($\beta$-dimethylaminoethyl) methacrylamide;
10-aminodecyl vinyl ether;
10-aminodecyl vinyl sulfide;
8-aminoocytyl vinyl ether;
Diethylaminohexyl methacrylate;
Diethylaminoethyl vinyl ether;
Diethylaminoethyl vinyl sulfide;
5-aminopentyl vinyl ether;
3-aminopropyl vinyl ether;
2-aminoethyl vinyl ether;
2-aminoethyl vinyl sulfide;
2-aminobutyl vinyl ether;
4-aminobutyl vinyl ether;
Dimethylaminoethyl methacrylate;
Dimethylaminoethyl vinyl ether;
Dimethylaminoethyl vinyl sulfide;
N-(3,5,5-trimethylhexyl) aminoethyl vinyl ether;
N-cyclohexylaminoethyl vinyl ether;
$\beta$-(t-Butylamino)ethyl acrylate;
2-(1,1,3,3-tetramethylbutylamino)ethyl methacrylate;
N-t-butylaminoethyl vinyl ether;
N-methylaminoethyl vinyl ether;
N-2-ethylhexylaminoethyl vinyl ether;
N-t-octylaminoethyl vinyl ether.
Additionally amines include

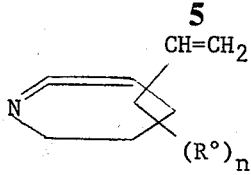

(II)

wherein R' is H or alkyl of 1 to 12 carbon atoms and n is an integer having a value of 1 to 4. Examples include
2-vinylpyridine;
3-vinylpyridine;
4-vinylpyridine;
2-methyl-5-vinylpyridine;
5-methyl-2-vinylpyridine;
4-methyl-2-vinylpyridine;
2-ethyl-5-vinylpridine;
2,3,4-trimethyl-5-vinylpyridine;
3,4,5,6-tetramethyl-2-vinylpyridine;
3-ethyl-5-vinylpyridine;
2,6-diethyl-4-vinylpyridine;
2-isopropyl-5-vinylpyridine;
2-methyl-5-undecyl-3-vinylpyridine;
3-dodecyl-4-vinylpryidine;
2,4-dimethyl-5,6-dipentyl-3-vinylpyridine;
2-decyl-5-(a-methylvinyl)-pyridine.

Further examples of monoethylenically unsaturated monomers that may be copolymerized to form the water-insoluble addition polymers are partial esters of unsaturated aliphatic dicarboxylic acids and particularly the alkyl half esters of such acids. Examples of such partial esters are alkyl half esters of itaconic acid, fumaric acid and maleic acid wherein the alkyl group contains 1 to 6 carbon atoms. Representative members of this group of compounds include mono-methyl ester of itaconic acid, mono-butyl ester of itaconic acid, mono-methyl ester of fumaric acid, mono-butyl ester of fumaric acid and mono-methyl ester of maleic acid.

The addition polymer is preferably made by the emulsion copolymerization of the several monomers in the proper proportions. Conventional emulsion polymerization techniques are described in U.s. Pat. Nos. 2,754,280 and 2,795,564. Thus, the monomers may be emulsified with an anionic, a cationic, or a nonionic dispersing agent, about 0.5 percent to 10 percent thereof being used on the weight of total monomers. The acid or amine monomers, if used, is of course, soluble in water so that the dispersing agent serves to emulsify the other monomers. A polymerization initiator of the free radical type, such as ammonium or potassium persulfate, may be used alone or in conjunction with an accelerator, such as potassium metabisulfite, or sodium thiosulfate. The initiator and accelerator, commonly referred to as catalyst, may be used in proportions of ½ to 2 percent each based on the weight of monomers to be copolymerized. The temperture may be from room temperature to 60°C. or more as is conventional.

The amount of an emulsifying or dispersing agent or agents is generally from 0.1 to 30 percent, and preferably 1 to 15 percent, of the combined weights of the polymer emulsion, wax emulsion and leveling agent. The dispersion should have a pH of at least about 3.0, and it may be as high as 11.0 or more. Most advantageously, its pH is from about 7 to about 10 as the use of lower pH values requires the use of nonionic emulsifier for the wax and generally excludes the inclusion of any substantial amount of leveling agent. Most available wax emulsions are based on alkaline dispersants so that a pH of 7 to 10 is normally most convenient. However, for special purposes, the pH may be in the range of 3 to 6.5. Thus, in the case of vinyl acetate copolymers, a pH in this range minimizes hydrolysis of the vinyl ester units. Suitable alkaline or buffering agents, such as borax, sodium hydroxide, ammonia, or amines, may be introduced to adjust the pH of the desired value.

Suitable anionic dispersing agents include the sodium salts of the higher fatty acid sulfates, such as that of lauryl alcohol, the higher fatty acid salts, such as the oleates or stearates or morpholine, 2-pyrrolidone, triethanolamine or mixed ethanolamines, or any of the nonionic types, such as ethylene oxide-modified alkyl phenols, of which tert-octyl phenol modified by 20 to 40 ethylene oxide units is representative, ethylene oxidemodified higher fatty alcohols, such as lauryl alcohol, containing 20 to 50 ethylene oxide units, similarly modified long-chain mercaptans, fatty acids, amines, or the like.

If the polymer is initially prepared by emulsion polymerization using an anionic emulsifier exclusively, it may be desirable to add a nonionic emulsifier to the polymer dispersion before adding the compound providing the polyvalent metal cations. The amount of the nonionic emulsifier needed depends on the amount of anionic emulsifier present and the amount of polyvalent metal compound to be added. Generally, about 0.1 to 10 percent or more of the nonionic surfactant is adequate.

The polyvalent metal complex may be incorporated into the composition at any stage of the formulation; generally it is convenient to add the polyvalent metal complex to the water-insoluble addition polymer. The polyvalent metal ions may be those of beryllium, cadmium, copper, calcium magnesium, zinc, zirconium, barium, strontium, aluminum, bismuth, antimony, lead, cobalt, iron, nickel, and may be added as a chelate usually in at least 1 percent by weight.

If the wax (when used) is separately dispersed, the dispersing agents mentioned above may similarly be used, but amine salts of soap, such as an ethanolamine oleate or stearate, are also quite useful. The waxes or mixtures of waxes which are used include waxes of a vegetable, animal, snythetic, and/or or mineral origin, or mixtures thereof, such as carnauba, candelilla, Fischer-Tropsch wax, microcrystalline wax, lanolin, cocoa butter, cotton-seed, stearin, Japan wax, bayberry, myrtle, mace, palm kernel, beewax, spermaceti, Chinese insect, mutton tallow, oxidized polyethylene wax, polyethylene emulsions, polypropylene, copolymers of ethylene and acrylic esters and acids, waxes obtained by the hydrogenation of coconut oil or soybean oils, and the mineral waxes such as paraffin, ceresin, montan, ozokerite, etc.

The polymer emulsion, wax emulsion and leveling agent may be mixed in any order desired. For example, the wax emulsion or leveling agent or both may be introduced into the aqueous polymer dispersion by adding a dispersion of the wax or leveling agent or both to the copolymer disperson or vice-versa. Preferably, the copolymer is added to a dispersion of the wax and then the leveling agent is mixed in. The wax emulsion may be prepared using any of the anionic or nonionic dispersing agents mentioned above for use in copolymerization. However, amine salts of soap such as ethanolamine or morpholine oleate or stearate, are quite useful. Besides incorporating the wax emulsion into the floor polishing compositions, an additional plasticizer may be included to aid film formation of the compositions.

The aqueous polish composition may contain up to about 75 percent by weight of the total weight of polymer, emulsion, leveling agent and wax emulsion of a plasticizer whenever it is necessary in a particular application, to provide a lower temperature of film formation from the emulsion polymer dispersions. From 5 to 35 percent by weight of the plasticizer, based on the weight of polymer emulsion, leveling agent and wax emulsion, however, is preferred.

Examples of plasticizers include the monoethyl of monomethyl ether of diethylene glycol, isophorone, benzyl, alcohol, and 3-methoxybutanol-1. Examples of essentially permanent plasticizers that are suitable include benzyl butyl phthalate, dibutyl phthalate, dimethyl phthalate, triphenyl phosphate, 2-ethyl hexyl benzyl phthalate, butyl cyclohexyl phthalate, mixed benzoic acid and fatty oil acid esters of pentaerythritol, poly(propylene adipate) dibenzoate diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di-2-ethylhexyl ester of hexamethylene glycol diphthalate, di(methylcyclohexyl) phthalate, tributoxyethyl phosphate, tributyl phosphate. Additionally, the ammonium salt of the $C_{21}$-dicarboxylic acid described above may be substituted for part or all of these plasticizers. The particular plasticizer and the amount thereof used are chosen in accordance with the demand for compatibility and efficiency in lowering the film-forming temperature.

Examples of wetting and dispersing agents include alkali metal and amine salts of higher fatty acids having 12 to 18 carbon atoms, such as sodium, potassium, ammonium or morpholine oleate or recinoleate, as well as the common nonionic surface active agents. Additional wetting agent improves the spreading action of the polish. Certain fluorocarbon surfactants also act as leveling agents, and these materials are described in U.S. Pat. No. 2,937,098.

The concentration of the aqueous dispersion for application purposes may desirably be from 8 45 percent solids and is preferably from about 10 to 20 percent by weight of solids.

When the aqueous floor polish composition is applied to a surface, a film is formed by the evaporation of the water present; and ammonia is released from the ammonium salt of the $C_{21}$-cycloaliphatic dicarboxylic acid leaving the free acid in the hardened film. The $C_{21}$-cycloaliphatic dicarboxylic acid is thus unique in that it is quite soluble in water prior to film formation and yet quite water insoluble (aiding detergent resistance) after film formation.

The compositions may be used for impregnating textiles, leather, paper, or other porous or fibrous materials. They may also be applied to plastic sheets such as cellophane, polyethylene, polyethylene glycol terephthalate, Saran and the like. They may also be applied to rigid surfaces, including all sorts of metals such as steel, aluminum, copper, brass, bronze, tin, chromium, and wrought iron, and to wood, stone, masonry, brick, glass, asbestos cement shingles or siding, terrazzo, cement and concrete surfaces such as floors, and so on. The compounds are especially valuable for polishing floors, such as those made of wood, linoleum, rubber, and all sorts of plastic tiles, such as linoleum, asphalt, vinyl, and vinyl-asbestos.

The compositions have good storage stability under normal conditions of temperature. They may be applied in the usual manner by means of wiping cloths, by brushing, or by means of mops. They dry rapidly to clear films, having hard and tough glossy surfaces. There is generally no discoloration of the films on ageing. The application of the compositions to surfaces carrying previously applied coatings of alkali-removable compositions does not remove appreciable amounts of such coating nor is the viscosity or consistency of the composition of the present invention detrimentally affected. Hence, the compositions go on the surface uniformly and with ease but without streakiness or other irregularities.

The following examples in which the parts and percentages are by weight unless otherwise indicated are illustrative of the invention.

EXAMPLE 1

This example illustrates the use of the ammonium salt of the $C_{21}$-cycloaliphatic dicarboxylic acid as both a leveling agent and a plasticizer in a dry-bright floor polish formulation. The components were formulated as indicated below:

a. The polymer dispersion was a polyacrylic emulsion polymer, Rhoplex B924 (38 percent solids) from Rohm and Haas. The emulsion was diluted with water to 15 percent polymer solids.

b. The leveling agent was the ammonium salt of the $C_{21}$-cycloaliphatic dicarboxylic acid having the formula described hereinabove used as a 40 percent solution at a pH of 7.8.

c. The was emulsion was prepared by melting in a pressure vessel 115.6 grams of low molecular weight polyethylene (Epolene E-10), 13.7 grams of morpholine and 20 grams of fatty acid emulsifier and 79 grams of water at 126°C. After heating 30 minutes at 126°C. with efficient stirring, uner 22 to 28 p.s.i. pressure developed by steam produced from the water, 288.5 grams of addition water at 90°C. to 98°C. was pumped into the pressure vessel maintaining the stirring efficiency.

d. The polymer dispersion of part (a) was mixed with the leveling agent from part (b) and the wax emulsion from part (c) in the proportions shown in the table below. To this mixture was also added 1 part of tributoxyethyl phosphate and 0.4 part of a 1 percent solution of fluorinated hydrocarbon surfactant of the formula $C_8F_{17}SO_2\text{-}N(C_2H_5)CH_2COOK$, sold under the name FC-128 by the 3-M Corporation. The formulation had a slightly translucent appearance.

e. The following tests were made on 9 inches × 9 inches white vinyl asbestos tile.

1. STREAKING – GLOSS – CLARITY

The tile was covered with 1.0 ml. of polish and let dry and evaluated. A second 1.0 ml. coat was then applied, dried, and evaluated. Finally, a third 2 ml. coat was applied, let dry and evaluated.

2. DETERGENT RESISTANCE

This test was run on tricoated tile (1 ml., + 1 ml., 2 ml.) on the Gardner Straight Line Washability and Abrasion Machine. Two commercial detergents were used at twice the manufacturers recommended level. (Spic and Span, Parson's Sudsy Ammonia) The test was run for 60 cycles on a Gardner Scrubability Apparatus. The tile was rinsed, allowed to dry and evaluated.

3. WATER RESISTANCE

One ml. of polish was spread over 30 square inches of a penetration opacity panel. One hour after the tile was coated, 10 drops of water were applied to form a circular water spot on two sections of the panel differing in porosity. One hour after application of the water, the wet polish film under the water was evaluated for whitening. The spot was then blotted dry and again evaluated 30 minutes later.

f. The results were compared to the following formulation and the observations recorded below.

| | Component, Parts | Prior Art Formulation | Invention Formulation |
|---|---|---|---|
| (a) | Polymer Dispersion (15%) | 80 | 80 |
| (b) | Leveling Agent (40%) | — | 8 |
| | (SMA 17325, (15%) from part (b), Example 2) | | |
| | | 5 | — |
| (c) | Wax Emulsion (15%) | — | 15 |
| | (Poly-EM 40, (15%)) | 15 | — |
| (d) | Plasticizers | | |
| | Diethylene Glycol Monoethyl Ether | 4 | — |
| | Dibutyl Phthate | 1 | — |
| | Tributoxyethyl Phosphate | 1 | 1 |
| (e) | Wetting Agent | 0.4 | 0.4 |

| Results | Prior Art Formulation | Invention Formulation |
|---|---|---|
| Streaking 1st Application | Excellent | Excellent |
| Streaking 2nd Application | Excellent | Excellent |
| Streaking 3rd Application | Excellent | Excellent |
| Film Clarity | Excellent | Good |
| Gloss | Poor | Excellent |
| Crazing | Good | Excellent |
| Cracking | Poor | Excellent |
| Water Spotting | Excellent | Excellent |
| Detergent Resistance | Stripped | Excellent |
| Formula Appearance | Deep Milky White | Slightly Translucent |

The detergent resistancy test was particularly good with no noticeable change showing the excellent water insolubility imparted in the film by the free acid of the $C_{21}$-cycloaliphatic dicarboxylic acid.

EXAMPLE 2

This example illustrates the use of the ammonia salt of $C_{21}$-dicarboxylic acid as a plasticizer in floor polish formulations. The leveling agent (b) was a resincut solution containing fifteen parts of an alkali-soluble glycerol modified rosin-maleic anhydride adduct, having a molecular weight of about 1000 and an acid number of about 140, in 62.5 parts of water containing 3.75 parts of 28 percent $NH_4OH$ solution was prepared by heating the mixture at 50°C. The resulting solution was filtered and then diluted to 15 percent solids. The formulation was as follows:

| | Component | Prior Art Formulation | Invention Formulation |
|---|---|---|---|
| (a) | Polymer Dispersion (15%) (from Example 1, part (a)) | 80 | 80 |
| (b) | Leveling Agent (40%) | 5 | 5 |
| (c) | Wax Emulsion (15%) (from Example 1, part (c)) | 15 | 15 |
| (d) | Plasticizers | | |
| | Diethylene Glycol Monoethyl Ether | 4 | — |
| | Dibutyl Phthate | 1 | — |
| | Tributoxyethyl Phosphate | 1 | 1 |
| | DiAcid DiAmmonium Salt (40%) | — | 8 |
| (e) | Wetting Agent | 0.4 | 0.4 |

The above polish formulation was evaluated according to the procedure of Example 1(e). The results of the slightly translucent formulation were similar to the results observed in Example 1.

While the invention has been described and illustrated herein by references to various specific materials, procedures and examples, it is understood that the invention is not restructed to the particular materials, combinations of materials, and procedures selected for that purpose. Numerous variations of such details can be employed, as will be appreciated by those skilled in the art.

What is claimed is:

1. An aqueous polish composition having a solids content between 8 percent and 45 percent comprising,
   a. 10 to 100 parts by weight of a water-insoluble addition polymer obtained by the emulsion polymerization of at least one monoethylenically unsaturated monomer,
   b. 0 to 90 parts by weight of a wax emulsion.
   c. 0 to 50 parts by weight of a leveling agent, with parts (a), (b) and (c) equaling 100,
   d. wetting, emulsifying, and dispersing agents in an amount of 0.5 percent to 20 percent by weight of the sum of parts (a), (b) and (c), and
   e. plasticizing agents in the amount of 5 to 35 percent by weight of the sum of parts (a), (b) and (c), the improvement wherein at least one of said plasticizing agents is the ammonium salt of a $C_{21}$-cycloaliphatic dicarboxylic acid having the formula

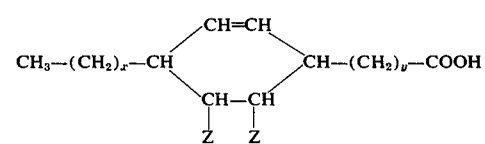

wherein x and y are integers from 3 to 9, x and y together equal 12, and Z is hydrogen or a carboxyl group with one Z of each moiety.

2. A composition according to claim 1 wherein said leveling agent is selected from the group consisting essentially of shellac, Manila gum, loba gum, alkali-soluble alkyds or polyesters, and copolymers of styrene or vinyl toluene with at least one $\alpha,\beta$ - monoethylenically unsaturated acid or anhydride.

3. A composition according to claim 1 wherein said leveling agent is the ammonium salt of a $C_{21}$-cycloaliphatic dicarboxylic acid having the formula

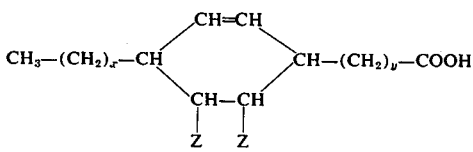

wherein x and y are integers from 3 to 9, x and y together equal 12, and Z is a hydrogen or carboxyl group with one Z of each moiety.

4. A composition according to claim 1 further comprising,
   e. at least one polyvalent metal complex in an amount of about 1 to 50 percent weight of said water-insoluble addition polymer.

5. A composition according to claim 1 wherein the sums of said leveling agent and said wax is at least 5 parts.

6. A composition according to claim 1 wherein the relative weight portions between polymer, leveling agent and wax are 40 to 70 parts of the polymer, 10 to 20 parts of the wax and 10 to 50 parts of the leveling agent.

7. An aqueous polish composition having a solids content between 8 and 45 percent comprising, a. 10 to 100 parts by weight of a water-insoluble addition polymer obtained by the emulsion polymerization of at least one monoethylenically unsaturated monomer.
b. 0 to 90 parts by weight of a wax emulsion,
c. 10 to 50 parts by weight of a leveling agent, with parts (a), (b) and (c) equaling 100,
d. wetting, emulsifying, and dispersing agents in an amount of 0.5 to 20 percent by weight of the sum of parts (a), (b) and (c), and
e. plasticizing agents in the amount of 5 to 35 percent by weight of the sum of parts (a), (b) and (c), the improvement wherein at said leveling agent is the ammonium salt of a $C_{21}$-cycloaliphatic dicarboxylic acid having the formula

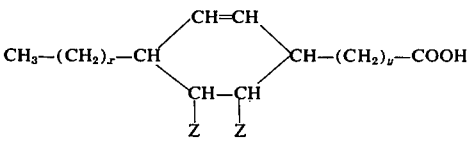

wherein x and y are integers from 3 to 9, x and y together equal 12, and Z is hydrogen or a carboxyl group with one Z of each moiety.

* * * * *

UNITED STATES PATENT OFFICE
CERTIFICATE OF CORRECTION

PATENT NO. : 3,926,893
DATED : December 16, 1975
INVENTOR(S) : Fred E. Woodward

It is certified that error appears in the above-identified patent and that said Letters Patent are hereby corrected as shown below:

Column 1, line 40, after "water" insert --soluble--.

Column 4, line 23, "Ch$_3$" should be --CH$_3$--.

Column 4, line 46, "8-aminoocytyl" should be --8-aminooctyl--.

Column 5, line 10, "R'" should be --R°--.

Column 5, line 18, "2-ethyl-5-vinylpridine;" should be --2-ethyl-5-vinylpyridine;--.

Column 5, line 43, "U.s." should be --U.S.--.

Column 5, line 57, "temperture" should be --temperature--.

Column 6, lines 17 and 18, "oxidemodified" should be --oxide-modified--.

Column 6, line 37, after "calcium" insert --,--.

Column 6, line 46, "snythetic" should be --synthetic--.

Column 6, line 46, delete "or" (second occurrence).

Column 7, line 7, delete "," (first occurrence).

Column 7, line 45, after the number "8" insert --to--.

Column 8, line 35, "was" (first occurrence) should be --wax--.

Column 8, line 40, "uner" should be --under--.

Column 8, line 64, "(1 ml., + 1 ml., 30" should be --(1 ml., + 1 ml., +--.

UNITED STATES PATENT OFFICE
CERTIFICATE OF CORRECTION

PATENT NO. : 3,926,893
DATED : December 16, 1975
INVENTOR(S) : Fred E. Woodward

It is certified that error appears in the above-identified patent and that said Letters Patent are hereby corrected as shown below:

Column 9, line 62, "resincut" should be --resin cut--.

Column 10, line 23, "restructed" should be --restricted--.

In Claim 4, column 11, line 15, after "percent" insert --by--.

In Claim 7, column 12, line 4, delete "." and insert to take its place --,--.

Signed and Sealed this sixteenth Day of March 1976

[SEAL]

Attest:

RUTH C. MASON
*Attesting Officer*

C. MARSHALL DANN
*Commissioner of Patents and Trademarks*